(12) United States Patent
Choi et al.

(10) Patent No.: US 11,654,974 B2
(45) Date of Patent: May 23, 2023

(54) VEHICLE BODY

(71) Applicants: Hyundai Motor Company, Seoul (KR); Kia Corporation, Seoul (KR)

(72) Inventors: Ji Ho Choi, Hwaseong-si (KR); Jong Seop Song, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 71 days.

(21) Appl. No.: 17/443,516

(22) Filed: Jul. 27, 2021

(65) Prior Publication Data
US 2022/0161867 A1 May 26, 2022

(30) Foreign Application Priority Data
Nov. 25, 2020 (KR) .......................... 10-2020-0160299

(51) Int. Cl.
| | |
|---|---|
| *B62D 25/20* | (2006.01) |
| *B62D 27/02* | (2006.01) |
| *B60K 15/067* | (2006.01) |
| *B62D 25/02* | (2006.01) |
| *B62D 27/06* | (2006.01) |
| *B60K 15/063* | (2006.01) |
| *B60K 15/03* | (2006.01) |

(52) U.S. Cl.
CPC ........ *B62D 25/2036* (2013.01); *B60K 15/067* (2013.01); *B62D 25/025* (2013.01); *B62D 27/02* (2013.01); *B62D 27/065* (2013.01); *B60K 2015/03315* (2013.01); *B60K 2015/0634* (2013.01)

(58) Field of Classification Search
CPC . B60K 15/067; B60K 1/04; B60K 2001/0438
See application file for complete search history.

(56) References Cited

U.S. PATENT DOCUMENTS 11,370,287 B2 * 6/2022 Tsuyuzaki ............ B62D 21/157

FOREIGN PATENT DOCUMENTS

| JP | 2004026088 A | * | 1/2004 |
|---|---|---|---|
| JP | 5115435 B2 | * | 1/2013 |

* cited by examiner

*Primary Examiner* — Dennis H Pedder
(74) *Attorney, Agent, or Firm* — Slater Matsil, LLP

(57) ABSTRACT

A vehicle body includes a floor assembly having a center floor and a rear floor, a pair of side structures connected to both sides of the floor assembly, and a pair of side sills connected to both side edges of the floor assembly, wherein each side sill includes an inner side sill facing an interior of the vehicle body, an outer side sill facing an exterior of the vehicle body, and first and second side sill reinforcements disposed between the inner side sill and the outer side sill, and wherein a rear end portion of the first side sill reinforcement overlaps a front end portion of the second side sill reinforcement.

20 Claims, 12 Drawing Sheets

VEHICLE BODY

CROSS-REFERENCE TO RELATED APPLICATIONS

This application claims the benefit of Korean Patent Application No. 10-2020-0160299, filed on Nov. 25, 2020, which application is hereby incorporated herein by reference.

TECHNICAL FIELD

The present disclosure relates to a vehicle body.

BACKGROUND

In recent years, as the perception of environmental crisis and depletion of oil resources has increased, research and development of eco-friendly vehicles such as electric vehicles (EVs) and fuel cell electric vehicles (FCEVs) have actively been conducted. Electric vehicles include plug-in hybrid electric vehicles (PHEVs), battery electric vehicles (BEVs), etc.

An electric vehicle is equipped with a high voltage battery assembly which is mounted to a vehicle body. The high voltage battery assembly includes one or more battery cells (or battery modules), electric/electronic components associated with the battery cells, a battery case in which the battery cells and the electric/electronic components are mounted, and a battery cover by which the top of the battery case is covered. A plurality of crossmembers are fixed to the inside of the battery case so that the plurality of crossmembers may increase stiffness and strength of the battery case.

The vehicle includes a pair of side sills disposed on the left and right sides of a floor. A front end of each side sill is connected to a rear end of a front side member, and a rear end of the side sill is connected to a front end of a rear side member. The side sills serve to protect a passenger compartment from side collisions and front collisions of the vehicle.

Each side sill includes an inner side sill connected to a side edge of the floor, an outer side sill facing the exterior of the vehicle, and a side sill reinforcement interposed between the inner side sill and the outer side sill.

Some vehicles such as sport utility vehicles (SUVs) and sedans may have a front side door mounted in a front side area of the vehicle body in a manner that swings inward and outward and a rear side door mounted in a rear side area of the vehicle body in a manner that swings inward and outward. A cross-sectional area of the side sill reinforcement may be kept the same in the front side area and the rear side area.

Other vehicles such as multi-purpose vehicles (MPVs) may have a front side door mounted in a front side area of the vehicle body in a manner that swings inward and outward and a rear side door slidably mounted in a rear side area of the vehicle body. That is, the front side door may be a swing door and the rear side door may be a sliding door. The MPV may have a roller guide track disposed in the side sill located in the rear side area, and the roller guide track may guide the movement of a roller carrier of the sliding door. As the roller guide track is disposed in the side sill located in the rear side area, a cross-sectional area of the side sill reinforcement may change between the front side area and the rear side area. That is, the cross-sectional area of the side sill reinforcement in the rear side area may be less than that of the side sill reinforcement in the front side area. In particular, the side sill reinforcement having a predetermined length may be formed by extruding, and then a portion thereof may be cut to match the roller guide track to be mounted in the rear side area.

In some vehicles to which the sliding door is applied, the side sill reinforcement may be partially cut, so an assembly process of the vehicle body may be complex and the amount of scraps may increase, resulting in increased manufacturing cost.

The above information described in this background section is provided to assist in understanding the background of the inventive concept, and may include any technical concept which is not considered as the prior art that is already known to those skilled in the art.

SUMMARY

The present disclosure relates to a vehicle body. Particular embodiments relate to a vehicle body capable of improving side impact performance (crashworthiness) by increasing side stiffness/side strength.

Embodiments of the present disclosure can solve problems occurring in the prior art while advantages achieved by the prior art are maintained intact.

An embodiment of the present disclosure provides a vehicle body capable of reducing manufacturing cost and improving side stiffness/side strength.

According to an embodiment of the present disclosure, a vehicle body may include a floor assembly having a center floor and a rear floor, a pair of side structures connected to both sides of the floor assembly, and a pair of side sills connected to both side edges of the floor assembly. Each side sill may include an inner side sill facing the interior of the vehicle, an outer side sill facing the exterior of the vehicle, and first and second side sill reinforcements disposed between the inner side sill and the outer side sill. A rear end portion of the first side sill reinforcement may overlap a front end portion of the second side sill reinforcement.

Each side structure may have a front side area adjacent to the front of the vehicle, and a rear side area adjacent to the rear of the vehicle. The first side sill reinforcement may be disposed on a bottom end of the front side area, and the second side sill reinforcement may be disposed on a bottom end of the rear side area.

The first side sill reinforcement may have a cut portion defined in the rear end portion thereof, and the cut portion may extend in a longitudinal direction of the first side sill reinforcement.

The front end portion of the second side sill reinforcement may be received in the cut portion of the first side sill reinforcement.

The first side sill reinforcement may be integrally connected to each side structure, and the second side sill reinforcement may be integrally connected to the floor assembly.

The vehicle body may further include a battery assembly disposed under the floor assembly. The battery assembly may include a battery housing and a pair of side mounts provided on both sides of the battery housing, respectively. The battery assembly may be connected to the first side sill reinforcement and the second side sill reinforcement through each side mount.

Each side mount of the battery assembly may be connected to both the rear end portion of the first side sill reinforcement and the front end portion of the second side sill reinforcement through a mounting bolt.

The vehicle body may further include a first pipe embedded in the first side sill reinforcement, and a first mounting bolt passing through the side mount and screwed into the first pipe.

The vehicle body may further include a second pipe embedded in the second side sill reinforcement, and a second mounting bolt passing through the side mount and screwed into the second pipe.

The vehicle body may further include a third pipe embedded in the rear end portion of the first side sill reinforcement, a fourth pipe embedded in the front end portion of the second side sill reinforcement, and a third mounting bolt passing through the side mount and screwed into both the third pipe and the fourth pipe.

The vehicle body may further include a hydrogen tank disposed under the floor assembly. The hydrogen tank may be connected to the first side sill reinforcement and the second side sill reinforcement through a support frame, and the support frame may be connected to both the rear end portion of the first side sill reinforcement and the front end portion of the second side sill reinforcement through a mounting bolt.

The support frame may include a first transverse member connected to the first side sill reinforcement, a second transverse member connected to the second side sill reinforcement, and a third transverse member connected to the rear end portion of the first side sill reinforcement and the front end portion of the second side sill reinforcement.

The vehicle body may further include a first pipe embedded in the first side sill reinforcement and a first mounting bolt passing through the first transverse member and screwed into the first pipe.

The vehicle body may further include a second pipe embedded in the second side sill reinforcement and a second mounting bolt passing through the second transverse member and screwed into the second pipe.

The vehicle body may further include a third pipe embedded in the rear end portion of the first side sill reinforcement, a fourth pipe embedded in the front end portion of the second side sill reinforcement, and a third mounting bolt passing through the third transverse member and screwed into both the third pipe and the fourth pipe.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
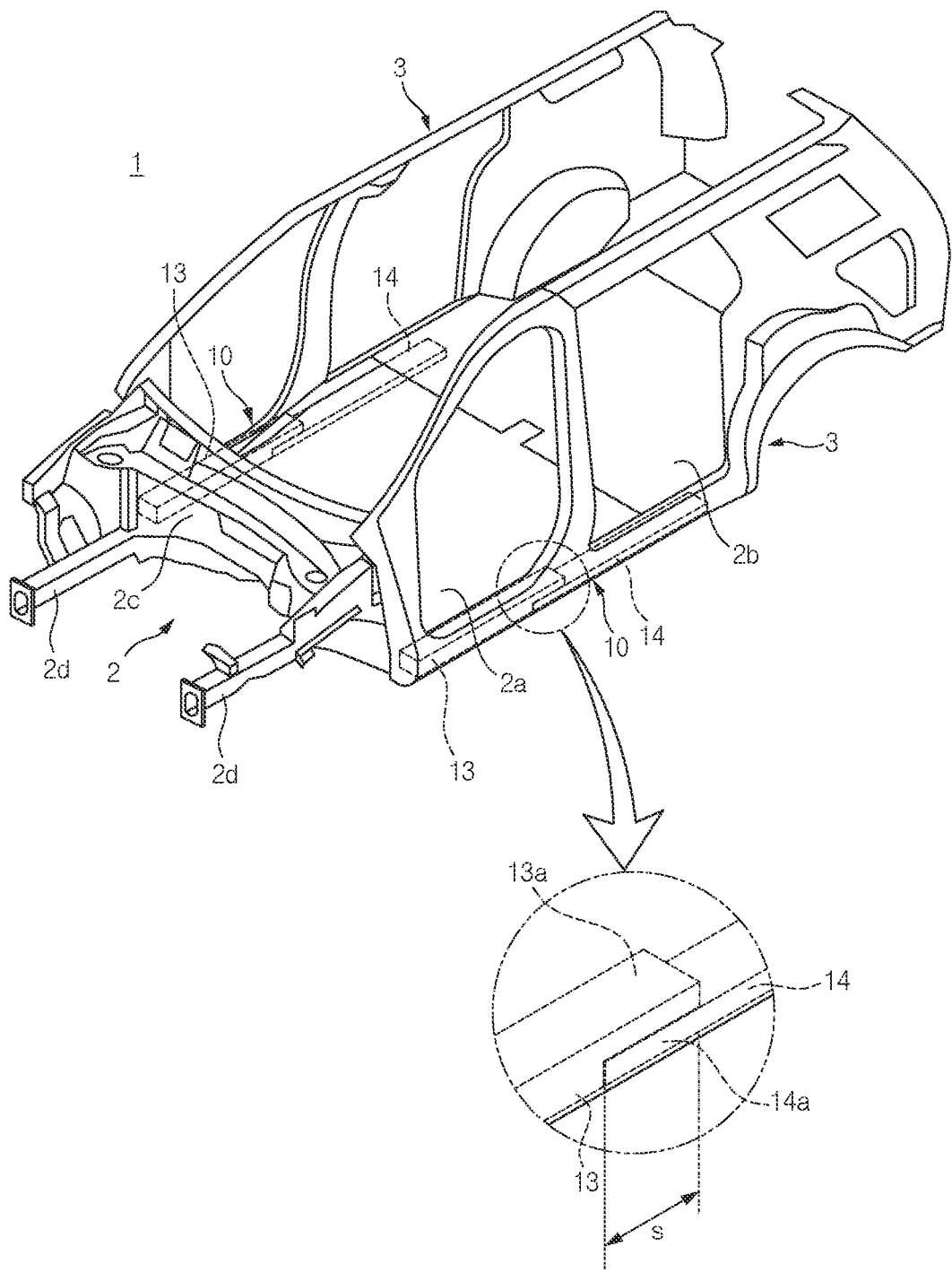
FIG. 1 illustrates a perspective view of a vehicle body according to an exemplary embodiment of the present disclosure.
Figure 2:
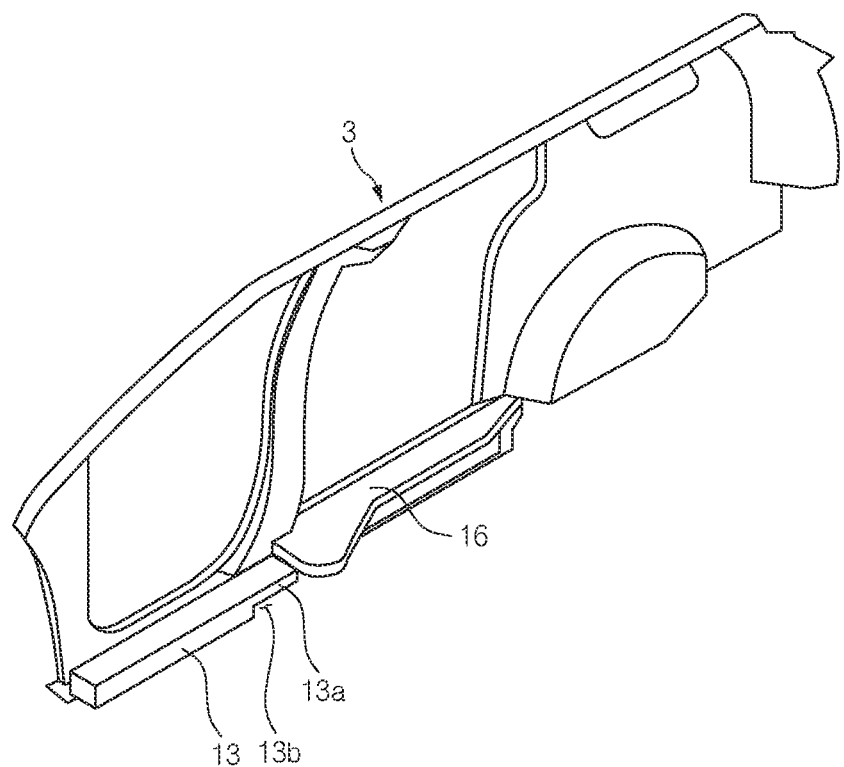
FIG. 2 illustrates a perspective view of a side structure of the vehicle body illustrated in FIG. 1.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle body 1 according to an exemplary embodiment of the present disclosure may include a floor assembly 2 and a pair of side structures 3 connected to both sides of the floor assembly 2.

Figure 3:
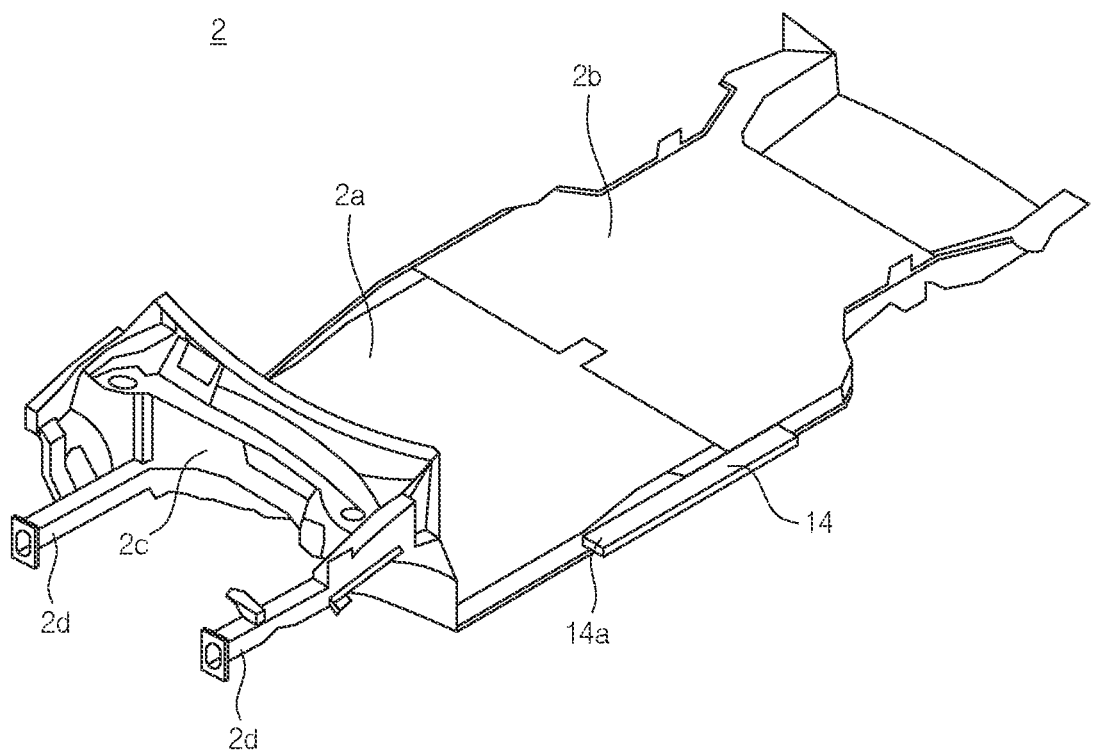
FIG. 3 illustrates a perspective view of a floor assembly of the vehicle body illustrated in FIG. 1.

Referring to FIGS. 1 and 3, the floor assembly 2 may include a center floor 2a, a rear floor 2b connected to a rear edge of the center floor 2a, a dash panel 2c connected to a front edge of the center floor 2a, and a front side member 2d connected to the dash panel 2c. The center floor 2a and the rear floor 2b may be arranged in a longitudinal direction of the vehicle.

Figure 4:
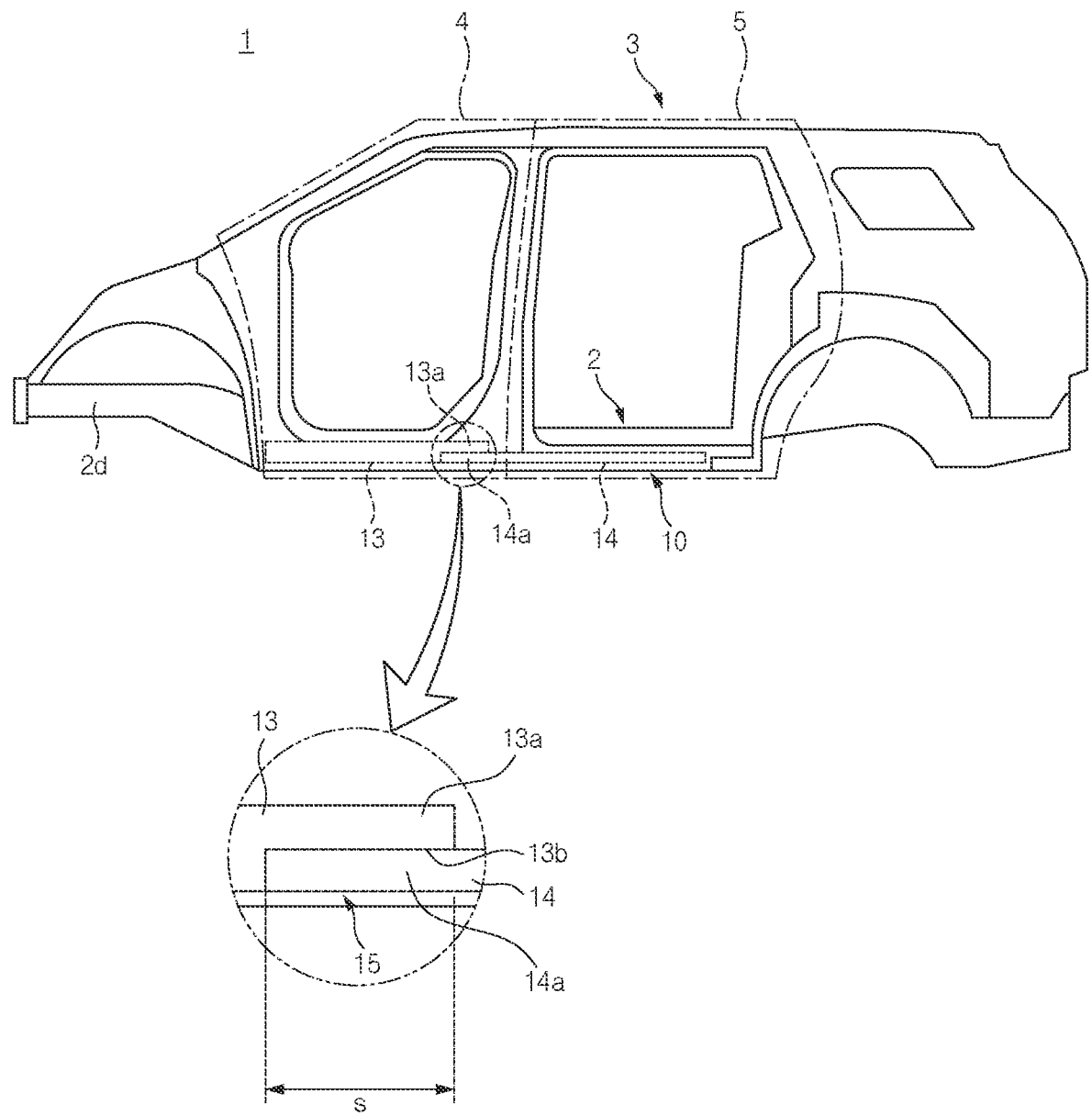
FIG. 4 illustrates a side view of the vehicle body illustrated in FIG. 1.
Figure 5:
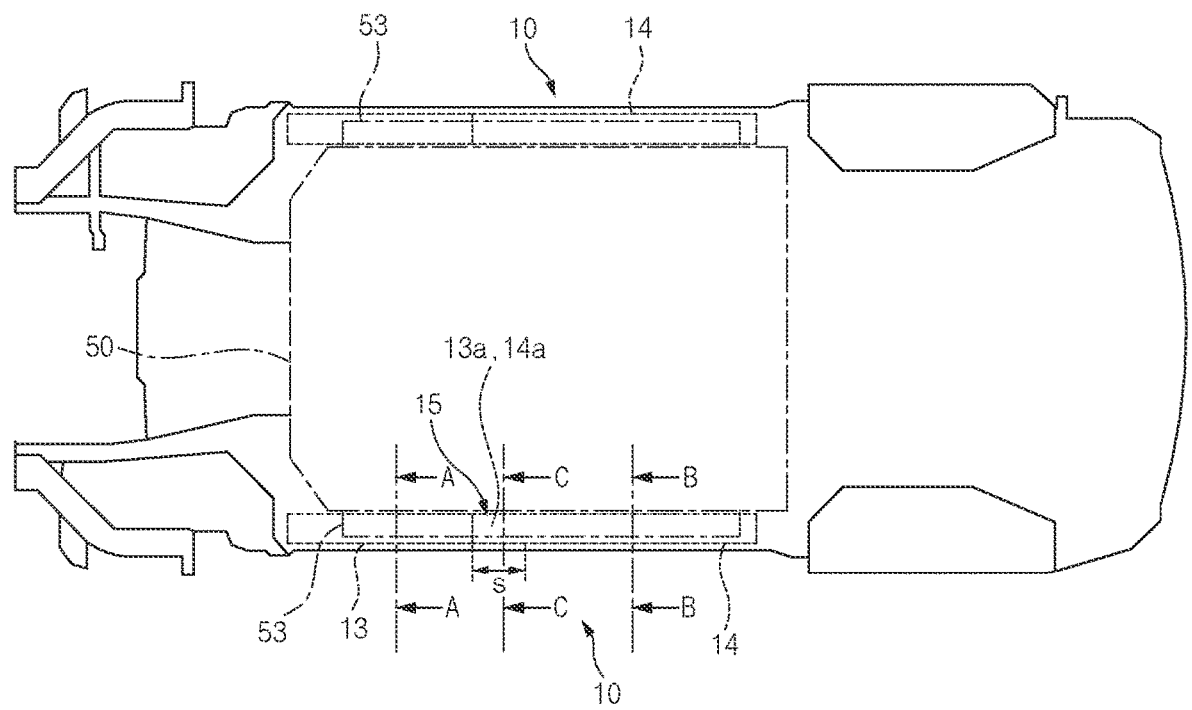
FIG. 5 illustrates a bottom view of the vehicle body illustrated in FIG. 1.

Referring to FIG. 4, each side structure 3 may have a front side area 4 adjacent to the front of the vehicle, and a rear side area 5 adjacent to the rear of the vehicle. A front side door may be mounted in the front side area 4 in a manner that swings inward and outward, and a rear side door may be slidably mounted in the rear side area 5.

Referring to FIG. 1, the vehicle body 1 according to an exemplary embodiment of the present disclosure may include a pair of side sills 10 connected to both side edges of the floor assembly 2. In particular, each side sill 10 may be connected to the center floor 2a and the rear floor 2b.

Each side sill 10 may include an inner side sill 11 facing the interior of the vehicle, an outer side sill 12 facing the exterior of the vehicle, and first and second side sill reinforcements 13 and 14 interposed between the inner side sill 11 and the outer side sill 12.

Figure 6:
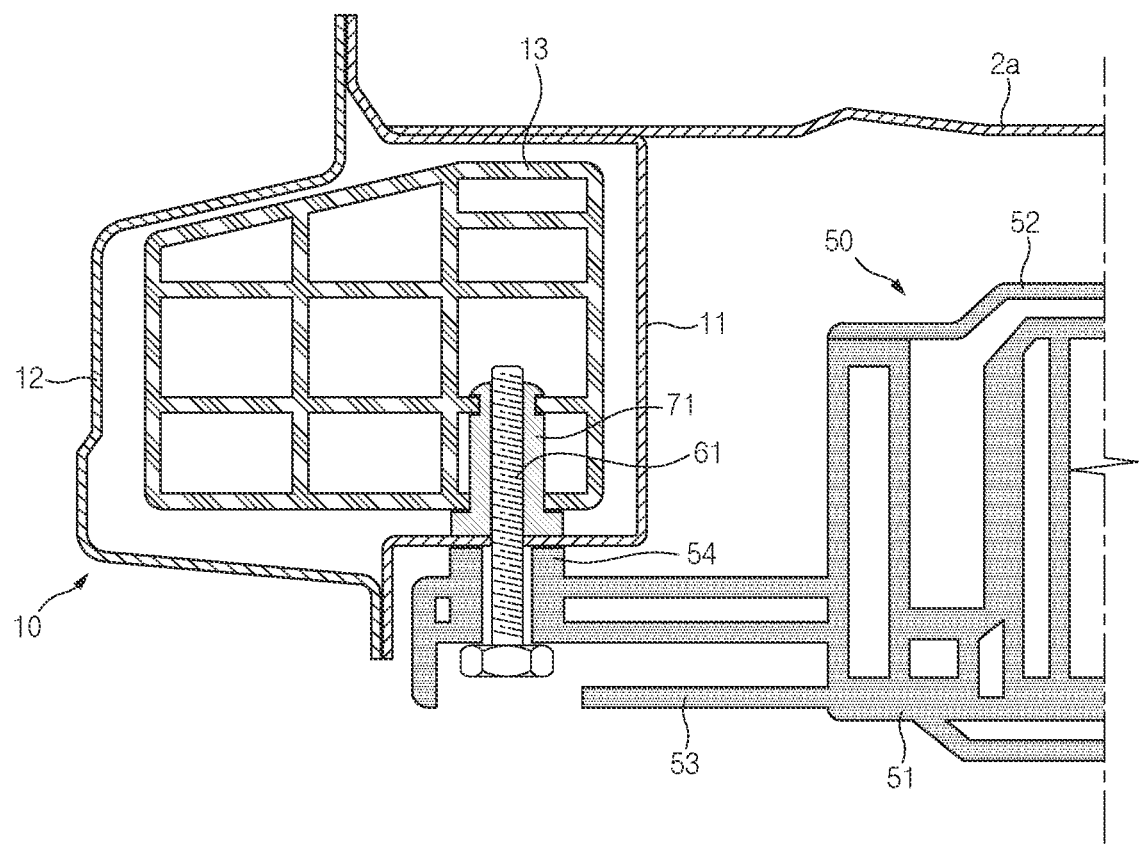
FIG. 6 illustrates a cross-sectional view, taken along line A-A of FIG. 5.
Figure 7:
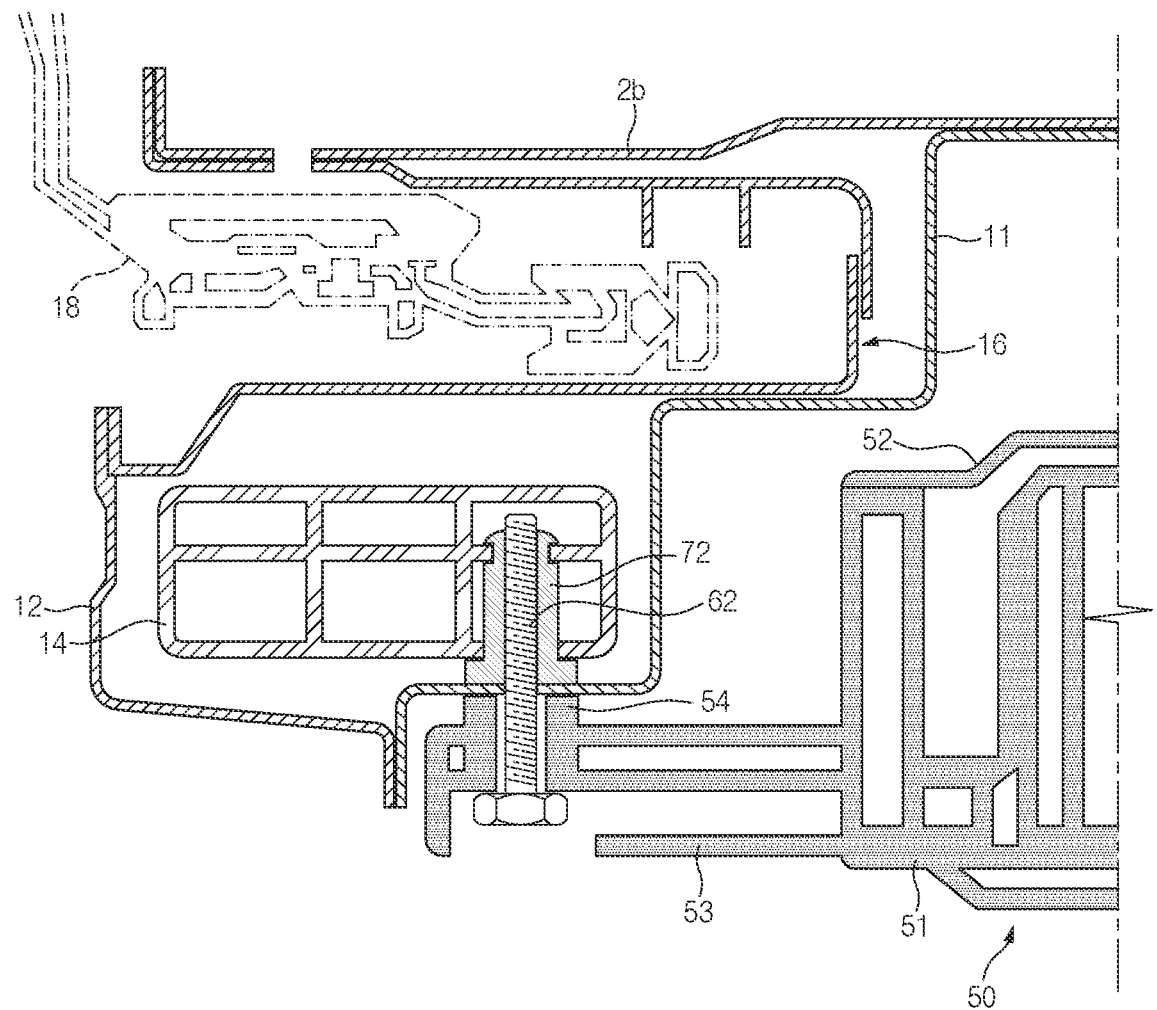
FIG. 7 illustrates a cross-sectional view, taken along line B-B of FIG. 5.
Figure 8:
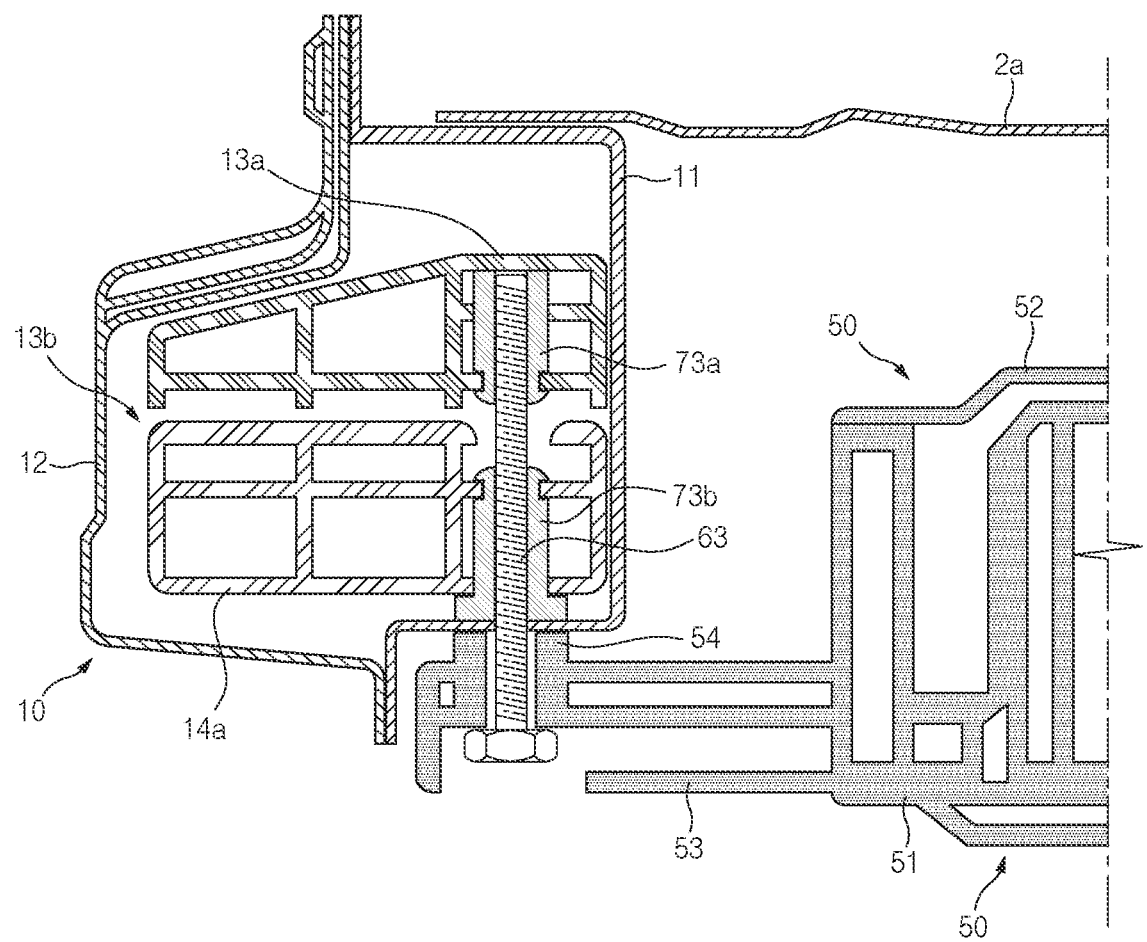
FIG. 8 illustrates a cross-sectional view, taken along line C-C of FIG. 5.
Figure 9:
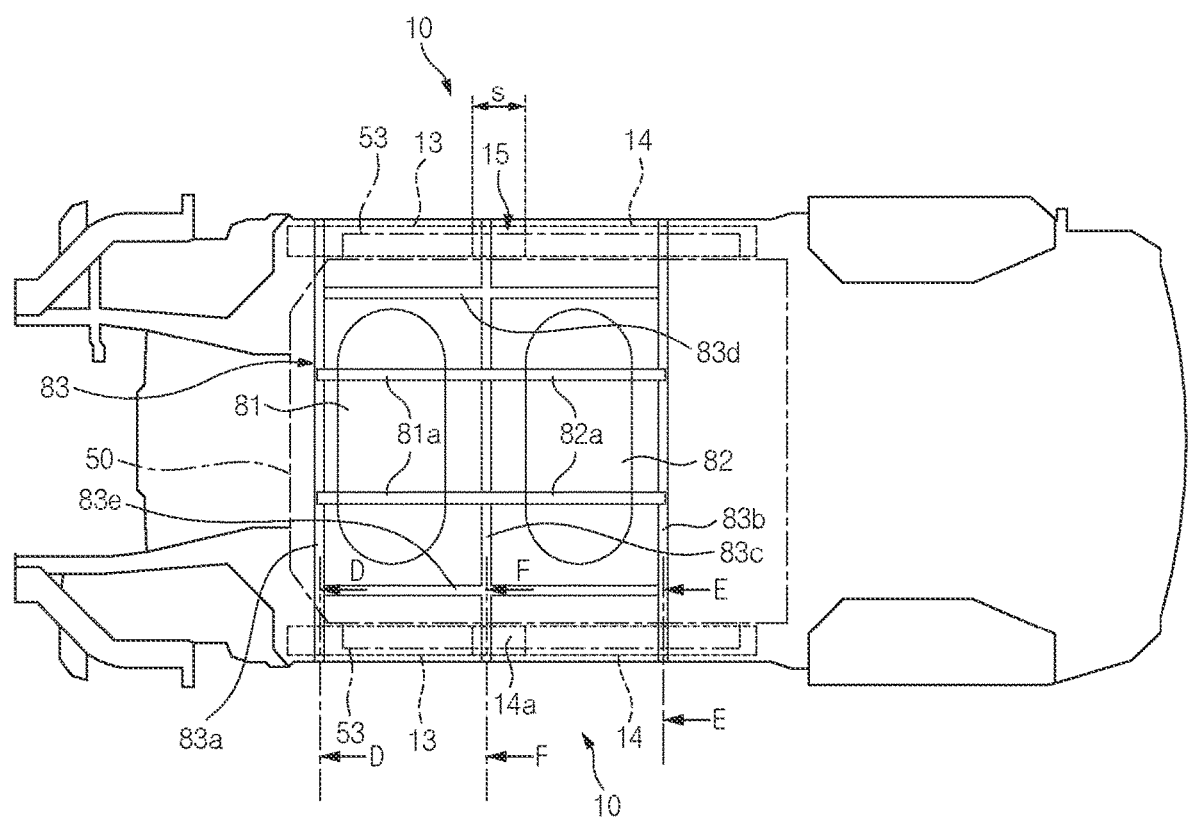
FIG. 9 illustrates a bottom view of a vehicle body according to another exemplary embodiment of the present disclosure.

The inner side sill 11 may extend in the longitudinal direction of the vehicle, and the inner side sill 11 may be connected a side edge of the center floor 2a and a side edge of the rear floor 2b by using fasteners, welding, and/or the like. Referring to FIGS. 6 and 8, a front end portion of the inner side sill 11 may be connected to the side edge of the center floor 2a by using fasteners, welding, and/or the like. Referring to FIG. 7, a rear end portion of the inner side sill 11 may be connected to the side edge of the rear floor 2b by using fasteners, welding, and/or the like.

The outer side sill 12 may extend in the longitudinal direction of the vehicle. The outer side sill 12 may be integrally connected to a bottom end of the side structure 3.

The outer side sill 12 and the inner side sill 11 may be joined by using fasteners, welding, and/or the like so that the outer side sill 12 and the inner side sill 11 may define a cavity, and the first side sill reinforcement 13 and the second side sill reinforcement 14 may be disposed in the cavity. The first side sill reinforcement 13 and the second side sill reinforcement 14 may be connected in a row along the longitudinal direction of the vehicle, and a rear end portion 13a of the first side sill reinforcement 13 may be connected to a front end portion 14a of the second side sill reinforcement 14.

The first side sill reinforcement 13 may be located at a bottom end of the front side area 4, and the first side sill reinforcement 13 may be located below the front side door (not shown). Since the front side door is a swing door, the first side sill reinforcement 13 may entirely fill the cavity defined by the inner side sill 11 and the outer side sill 12.

The first side sill reinforcement 13 may extend in the longitudinal direction of the vehicle, and the first side sill reinforcement 13 may have a cut portion 13b defined in the rear end portion 13a. As a lower portion of the rear end portion 13a of the first side sill reinforcement 13 is cut to a predetermined length, the cut portion 13b may be defined in the lower portion of the rear end portion 13a of the first side sill reinforcement 13. The cut portion 13b may extend in a longitudinal direction of the first side sill reinforcement.

The second side sill reinforcement 14 may be located at a bottom end of the rear side area 5, and the second side sill reinforcement 14 may be located below the rear side door (not shown). The rear side door may be a sliding door. A roller guide track 16 may be located above the side sill 10, and the roller guide track 16 may be open to the exterior of the vehicle. The roller guide track 16 may guide the movement of a roller carrier 18 of the rear side door. The second side sill reinforcement 14 may be located below the roller guide track 16, and the second side sill reinforcement 14 may be disposed adjacent to the bottom of the side sill 10 within the cavity of the side sill 10. The second side sill reinforcement 14 may extend in the longitudinal direction of the vehicle, and the second side sill reinforcement 14 may have the front end portion 14a which is received in the cut portion 13b of the first side sill reinforcement 13.

As the front end portion 14a of the second side sill reinforcement 14 is received in the cut portion 13b of the first side sill reinforcement 13, the rear end portion 13a of the first side sill reinforcement 13 may overlap the front end portion 14a of the second side sill reinforcement 14. Thus, the rear end portion 13a of the first side sill reinforcement 13 and the front end portion 14a of the second side sill reinforcement 14 may form an overlapping portion 15 having a predetermined length s. The overlapping portion 15 may be located within the front side area 4.

By reducing the length of the overlapping portion 15 between the first side sill reinforcement 13 disposed on the bottom end of the front side area 4 and the second side sill reinforcement 14 disposed on the bottom end of the rear side area 5, a cutting length for forming the cut portion 13b in the rear end portion 13a of the first side sill reinforcement 13 may be minimized, and thus the manufacturing cost may be significantly reduced.

The first side sill reinforcement 13 may be mounted to the outer side sill 12 by brackets and/or the like, and the outer side sill 12 may be integrally connected to the bottom end of the side structure 3. The first side sill reinforcement 13 may be integrally connected to the bottom end of the side structure 3 through the outer side sill 12. That is, each side structure 3 may be a single assembly structure including the outer side sill 12 and the first side sill reinforcement 13.

The second side sill reinforcement 14 may be mounted to the inner side sill 11 by brackets and/or the like, and the inner side sill 11 may be connected to the side edge of the center floor 2a and the side edge of the rear floor 2b of the floor assembly 2. The second side sill reinforcement 14 may be integrally connected to the side edge of the floor assembly 2 through the inner side sill 11. That is, the floor assembly 2 may be a single assembly structure including the inner side sill 11 and the second side sill reinforcement 14.

As described above, the first side sill reinforcement 13 may be integrally connected to the bottom end of the side structure 3, and the second side sill reinforcement 14 may be integrally connected to the side edge of the floor assembly 2. Accordingly, since there is no need to additionally assemble the first side sill reinforcement 13 and the second side sill reinforcement 14 during an assembly process of the vehicle body 1, man-hours (the amount of work) during the assembly process may be kept the same as in the prior art. Thus, the equipment investment and manufacturing costs may be reduced.

Referring to FIGS. 5 to 8, the vehicle body 1 according to an exemplary embodiment of the present disclosure may further include a battery assembly 50 disposed under the center floor 2a and the rear floor 2b of the floor assembly 2. The battery assembly 50 may include one or more battery cells (or battery modules), electric/electronic components associated with the battery cells, a battery housing 51 in which the battery cells and the electric/electronic components are mounted, and a battery cover 52 by which the top of the battery housing 51 is covered.

The battery housing 51 may have a pair of side mounts 53 provided on both sides thereof, respectively. Each side mount 53 may extend toward the side sill 10, and be connected to the first and second side sill reinforcements 13 and 14 through a plurality of mounting bolts 61, 62, and 63 and a plurality of pipes 71, 72, 73a, and 73b. In particular, each side mount 53 of the battery assembly 50 may be connected to both the rear end portion 13a of the first side sill reinforcement 13 and the front end portion 14a of the second side sill reinforcement 14 through the mounting bolts 61, 62, and 63 so that connection stiffness of the first side sill reinforcement 13 and the second side sill reinforcement 14 may be increased, and side stiffness/side strength of the vehicle body may be improved.

A front portion of the side mount 53 may be connected to the first side sill reinforcement 13 through at least one first mounting bolt 61 and at least one first pipe 71. Referring to FIG. 6, the first pipe 71 may be embedded in the first side sill reinforcement 13, and the first mounting bolt 61 may pass through a through hole of the side mount 53 and be screwed into the first pipe 71 so that the side mount 53 of the battery assembly 50 may be connected to the first side sill reinforcement 13.

A rear portion of the side mount 53 may be connected to the second side sill reinforcement 14 through at least one second mounting bolt 62 and at least one second pipe 72.

Referring to FIG. 7, the second pipe 72 may be embedded in the second side sill reinforcement 14, and the second mounting bolt 62 may pass through a through hole of the side mount 53 and be screwed into the second pipe 72 so that the side mount 53 of the battery assembly 50 may be connected to the second side sill reinforcement 14.

A middle portion of the side mount 53 may be connected to the overlapping portion 15 of the first side sill reinforcement 13 and the second side sill reinforcement 14 through at least one third mounting bolt 63, at least one third pipe 73a, and at least one fourth pipe 73b. Referring to FIG. 8, the third pipe 73a may be embedded in the rear end portion 13a of the first side sill reinforcement 13, and the fourth pipe 73b may be embedded in the front end portion 14a of the second side sill reinforcement 14. The third pipe 73a may be aligned with the fourth pipe 73b in a height direction of the vehicle. The third mounting bolt 63 may pass through a through hole of the side mount 53 and be screwed into both the third pipe 73a and the fourth pipe 73b so that the side mount 53 of the battery housing 51 may be connected to both the rear end portion 13a of the first side sill reinforcement 13 and the front end portion 14a of the second side sill reinforcement 14.

Referring to FIGS. 6 to 8, the side mount 53 may have a support projection 54 protruding from a top surface thereof toward the side sill 10. The support projection 54 may contact the side sill 10 so that the side sill 10 may be stably supported by the support projection 54.

Referring to FIGS. 9 to 12, the vehicle body according to another exemplary embodiment of the present disclosure may further include a plurality of hydrogen tanks 81 and 82 disposed under the center floor 2a and the rear floor 2b, and the plurality of hydrogen tanks 81 and 82 may be mounted under the vehicle body 1 through a plurality of mounting bands or mounting brackets 81a and 82a and a support frame 83. The mounting brackets 81a and 82a may directly contact the corresponding hydrogen tanks 81 and 82. For example, each of the mounting brackets 81a and 82a may have a semicircular shape corresponding to that of the exterior surface of the hydrogen tanks 81 and 82. The plurality of mounting brackets 81a and 82a may be connected to the support frame 83. The support frame 83 may be connected to the first and second side sill reinforcements 13 and 14 through a plurality of mounting bolts 161, 162, and 163 and a plurality of pipes 171, 172, 173a, and 173b. In particular, the support frame 83 may be connected to both the rear end portion 13a of the first side sill reinforcement 13 and the front end portion 14a of the second side sill reinforcement 14 through the mounting bolts 161, 162, and 163 so that connection stiffness of the first side sill reinforcement 13 and the second side sill reinforcement 14 may be increased.

The support frame 83 may include a plurality of transverse members 83a, 83b, and 83c extending in a width direction of the vehicle, and a plurality of longitudinal members 83d and 83e extending in the longitudinal direction of the vehicle.

The plurality of transverse members 83a, 83b, and 83c may include a first transverse member 83a connected to the first side sill reinforcement 13, a second transverse member 83b connected to the second side sill reinforcement 14, and a third transverse member 83c connected to the rear end portion 13a of the first side sill reinforcement 13 and the front end portion 14a of the second side sill reinforcement 14. Each end portion of the first transverse member 83a may be connected to the first side sill reinforcement 13 of the corresponding side sill 10, each end portion of the second transverse member 83b may be connected to the second side sill reinforcement 14 of the corresponding side sill 10, and each end portion of the third transverse member 83c may be connected to the overlapping portion 15 between the first side sill reinforcement 13 and the second side sill reinforcement 14 of the corresponding side sill 10.

Figure 10:
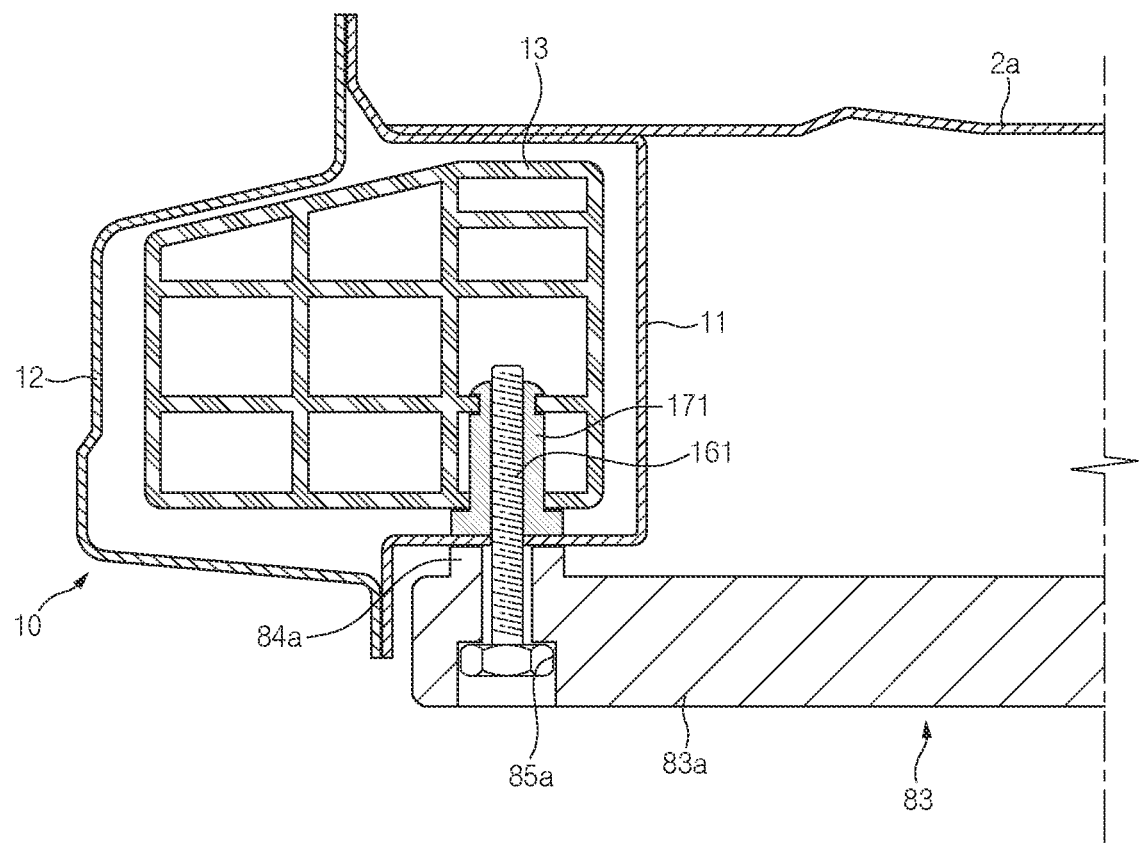
FIG. 10 illustrates a cross-sectional view, taken along line D-D of FIG. 9.

Referring to FIG. 10, a first pipe 171 may be embedded in the first side sill reinforcement 13, and a first mounting bolt 161 may pass through a through hole of the first transverse member 83a and be screwed into the first pipe 171 so that the end portion of the first transverse member 83a of the support frame 83 may be connected to the first side sill reinforcement 13. The first transverse member 83a may have a first support projection 84a protruding from a top surface thereof toward the side sill 10. The first support projection 84a may directly contact the side sill 10 so that the side sill 10 may be stably supported by the first support projection 84a.

Figure 11:
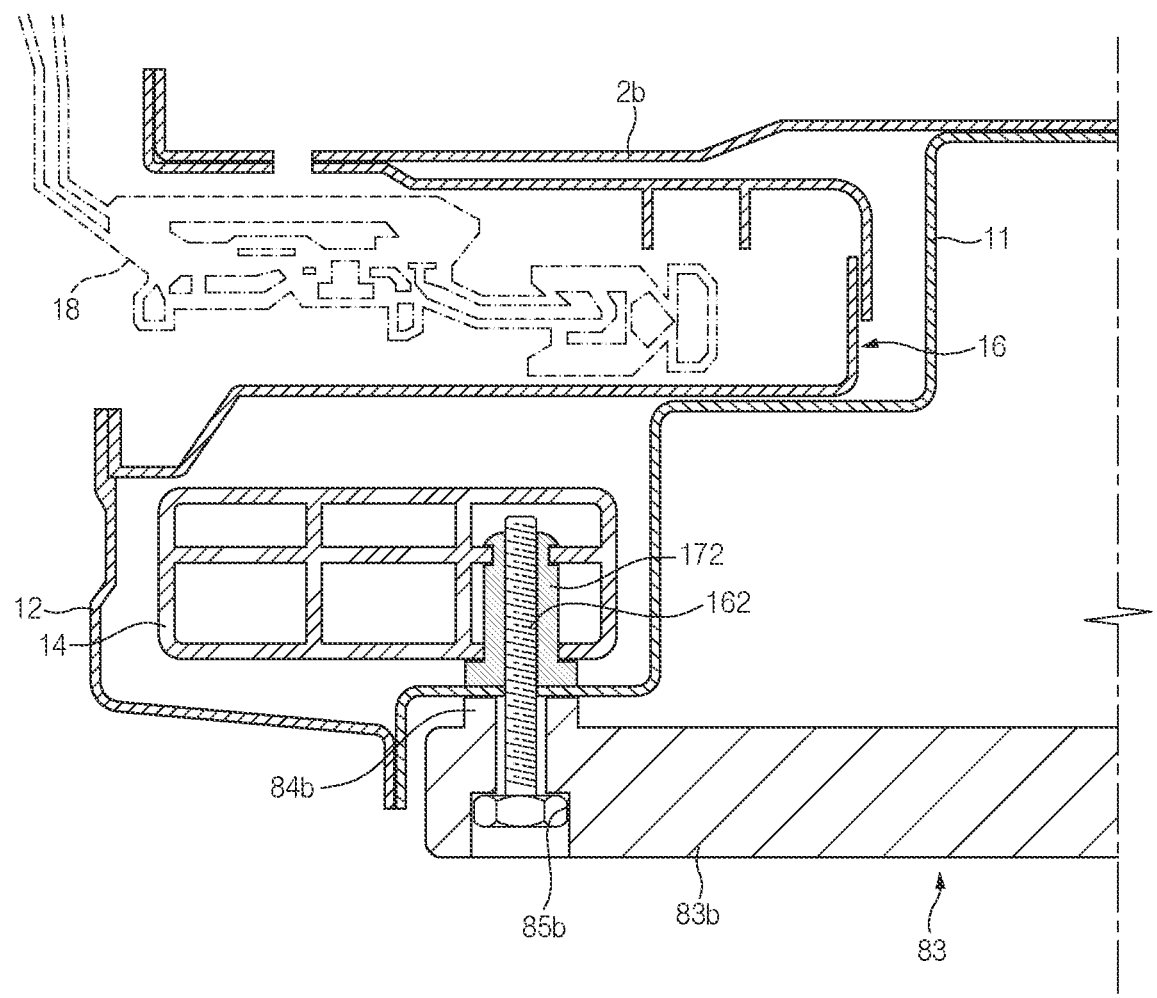
FIG. 11 illustrates a cross-sectional view, taken along line E-E of FIG. 9.

Referring to FIG. 11, a second pipe 172 may be embedded in the second side sill reinforcement 14, and a second mounting bolt 162 may pass through a through hole of the second transverse member 83b and be screwed into the second pipe 172 so that the end portion of the second transverse member 83b of the support frame 83 may be connected to the second side sill reinforcement 14. The second transverse member 83b may have a second support projection 84b protruding from a top surface thereof toward the side sill 10. The second support projection 84b may directly contact the side sill 10 so that the side sill 10 may be stably supported by the second support projection 84b.

Figure 12:
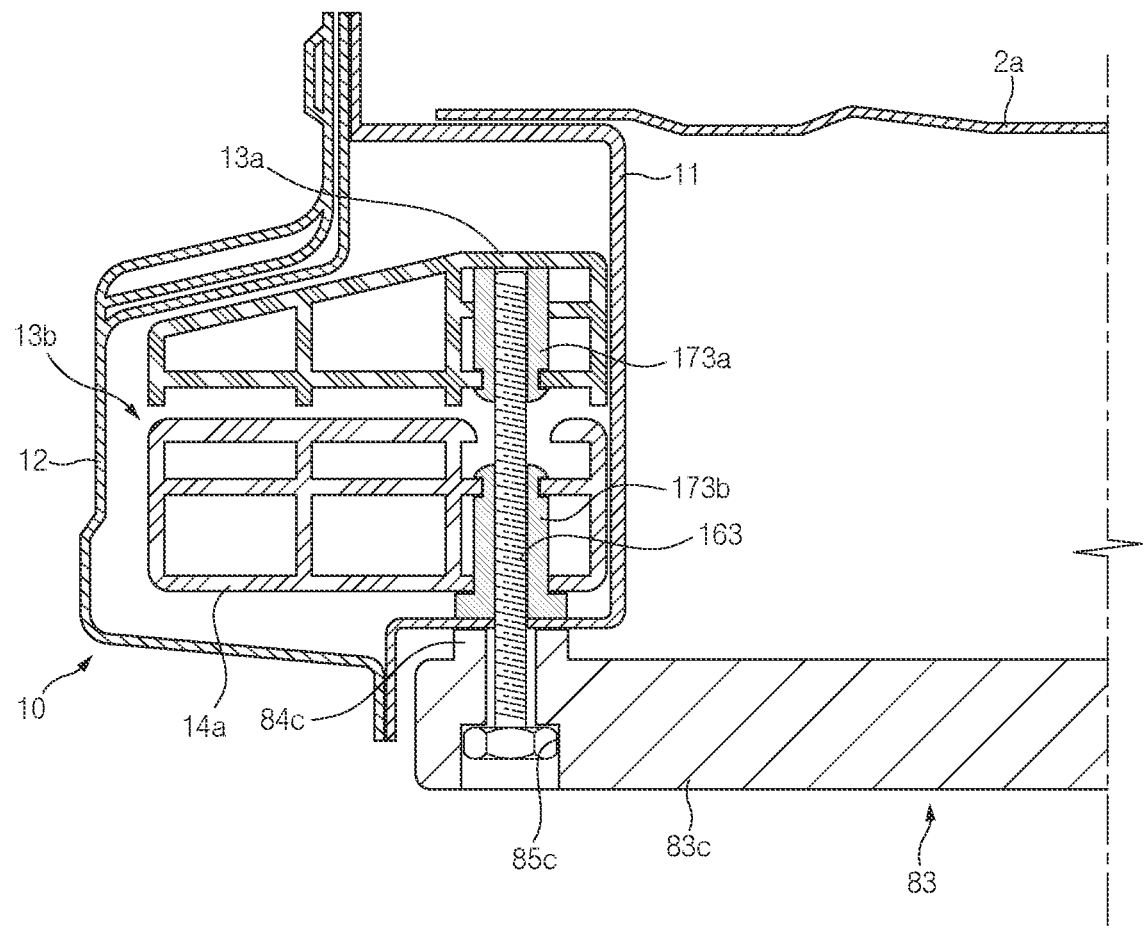
FIG. 12 illustrates a cross-sectional view, taken along line F-F of FIG. 9.

Referring to FIG. 12, a third pipe 173a may be embedded in the rear end portion 13a of the first side sill reinforcement 13, and a fourth pipe 173b may be embedded in the front end portion 14a of the second side sill reinforcement 14. A third mounting bolt 163 may pass through a through hole of the third transverse member 83c and be screwed into both the third pipe 173a and the fourth pipe 173b so that the end portion of the third transverse member 83c of the support frame 83 may be connected to both the rear end portion 13a of the first side sill reinforcement 13 and the front end portion 14a of the second side sill reinforcement 14. The third transverse member 83c may have a third support projection 84c protruding from a top surface thereof toward the side sill 10. The third support projection 84c may directly contact the side sill 10 so that the side sill 10 may be stably supported by the third support projection 84c.

As set forth above, according to exemplary embodiments of the present disclosure, the overlapping portion between the first side sill reinforcement disposed on the bottom end of the front side area and the second side sill reinforcement disposed on the bottom end of the rear side area may be relatively shortened, and accordingly a cutting length for forming the cut portion in the rear end portion of the first side sill reinforcement may be minimized. Thus, the manufacturing cost may be significantly reduced.

According to exemplary embodiments of the present disclosure, the first side sill reinforcement may be integrally connected to the bottom end of the side structure, and the second side sill reinforcement may be integrally connected to the side edge of the floor assembly. Since there is no need to additionally assemble the first side sill reinforcement and the second side sill reinforcement during the assembly process of the vehicle body, the man-hours (the amount of work) during the assembly process may be kept the same as in the prior art, and thus the equipment investment and manufacturing costs may be reduced.

According to exemplary embodiments of the present disclosure, the battery assembly or the hydrogen tanks mounted under the floor assembly may be connected to both the rear end portion of the first side sill reinforcement and the front end portion of the second side sill reinforcement through the mounting bolts and/or the like so that the connection stiffness of the first side sill reinforcement and the second side sill reinforcement may be increased, and the stiffness/strength of the vehicle body may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle body comprising:
a floor assembly having a center floor and a rear floor;
a pair of side structures connected to both sides of the floor assembly; and
a pair of side sills connected to both side edges of the floor assembly;
wherein each side sill includes an inner side sill facing an interior of the vehicle body, an outer side sill facing an exterior of the vehicle body, and first and second side sill reinforcements disposed between the inner side sill and the outer side sill; and
wherein a rear end portion of the first side sill reinforcement overlaps a front end portion of the second side sill reinforcement;
wherein the first side sill reinforcement has a cut portion defined in the rear end portion thereof; and
wherein the cut portion extends in a longitudinal direction of the first side sill reinforcement.

2. The vehicle body according to claim 1, wherein:
each side structure has a front side area adjacent to a front of the vehicle body, and a rear side area adjacent to a rear of the vehicle body;
the first side sill reinforcement is disposed on a bottom end of the front side area; and
the second side sill reinforcement is disposed on a bottom end of the rear side area.

3. The vehicle body according to claim 1, wherein the front end portion of the second side sill reinforcement is received in the cut portion of the first side sill reinforcement.

4. The vehicle body according to claim 1, wherein:
the first side sill reinforcement is integrally connected to each side sill; and
the second side sill reinforcement is integrally connected to the floor assembly.

5. The vehicle body according to claim 1, further comprising a battery assembly disposed under the floor assembly, wherein the battery assembly includes a battery housing and a pair of side mounts provided on both sides of the battery housing, respectively, and the battery assembly is connected to the first side sill reinforcement and the second side sill reinforcement through each side mount.

6. The vehicle body according to claim 5, wherein each side mount of the battery assembly is connected to both the rear end portion of the first side sill reinforcement and the front end portion of the second side sill reinforcement through a mounting bolt.

7. The vehicle body according to claim 5, further comprising:
a first pipe embedded in the first side sill reinforcement; and
a first mounting bolt passing through one of the side mounts and screwed into the first pipe.

8. The vehicle body according to claim 5, further comprising:
a second pipe embedded in the second side sill reinforcement; and
a second mounting bolt passing through one of the side mounts and screwed into the second pipe.

9. The vehicle body according to claim 5, further comprising:
a third pipe embedded in the rear end portion of the first side sill reinforcement;
a fourth pipe embedded in the front end portion of the second side sill reinforcement; and
a third mounting bolt passing through one of the side mounts and screwed into both the third pipe and the fourth pipe.

10. A vehicle body comprising:
a floor assembly having a center floor and a rear floor;
a pair of side structures connected to both sides of the floor assembly;
a pair of side sills connected to both side edges of the floor assembly, wherein each side sill includes an inner side sill facing an interior of the vehicle body, an outer side sill facing an exterior of the vehicle body, and first and second side sill reinforcements disposed between the inner side sill and the outer side sill, and wherein a rear end portion of the first side sill reinforcement overlaps a front end portion of the second side sill reinforcement; and
a hydrogen tank disposed under the floor assembly, wherein the hydrogen tank is connected to the first side sill reinforcement and the second side sill reinforcement through a support frame, and the support frame is connected to both the rear end portion of the first side sill reinforcement and the front end portion of the second side sill reinforcement through a mounting bolt;
wherein the first side sill reinforcement has a cut portion defined in the rear end portion thereof; and
wherein the cut portion extends in a longitudinal direction of the first side sill reinforcement.

11. The vehicle body according to claim 10, wherein the support frame includes a first transverse member connected to the first side sill reinforcement, a second transverse member connected to the second side sill reinforcement, and a third transverse member connected to the rear end portion of the first side sill reinforcement and the front end portion of the second side sill reinforcement.

12. The vehicle body according to claim 11, further comprising:
a first pipe embedded in the first side sill reinforcement; and
a first mounting bolt passing through the first transverse member and screwed into the first pipe.

13. The vehicle body according to claim 11, further comprising:
a second pipe embedded in the second side sill reinforcement; and
a second mounting bolt passing through the second transverse member and screwed into the second pipe.

14. The vehicle body according to claim 11, further comprising:
a third pipe embedded in the rear end portion of the first side sill reinforcement;
a fourth pipe embedded in the front end portion of the second side sill reinforcement; and
a third mounting bolt passing through the third transverse member and screwed into both the third pipe and the fourth pipe.

15. A vehicle comprising:
a floor assembly comprising a center floor and a rear floor connected to a rear edge of the center floor;
a dash panel connected to a front edge of the center floor;
a front side member connected to the dash panel;
a pair of side structures connected to both sides of the floor assembly; and
a pair of side sills connected to both side edges of the floor assembly, each side sill including an inner side sill facing an interior of the vehicle, an outer side sill facing an exterior of the vehicle, and first and second side sill reinforcements disposed between the inner side sill and the outer side sill, wherein a rear end portion of the first side sill reinforcement overlaps a front end portion of the second side sill reinforcement;
wherein each side structure has a front side area adjacent to a front of the vehicle and a rear side area adjacent to a rear of the vehicle;
wherein the first side sill reinforcement is disposed on a bottom end of the front side area;
wherein the second side sill reinforcement is disposed on a bottom end of the rear side area
wherein the first side sill reinforcement has a cut portion defined in the rear end portion thereof; and
wherein the cut portion extends in a longitudinal direction of the first side sill reinforcement.

16. The vehicle according to claim 15, wherein the front end portion of the second side sill reinforcement is received in the cut portion of the first side sill reinforcement.

17. The vehicle according to claim 15, wherein:
the first side sill reinforcement is integrally connected to each side sill; and
the second side sill reinforcement is integrally connected to the floor assembly.

18. The vehicle body according to claim 10, wherein:
each side structure has a front side area adjacent to a front of the vehicle body, and a rear side area adjacent to a rear of the vehicle body;
the first side sill reinforcement is disposed on a bottom end of the front side area; and
the second side sill reinforcement is disposed on a bottom end of the rear side area.

19. The vehicle body according to claim 10, wherein the front end portion of the second side sill reinforcement is received in the cut portion of the first side sill reinforcement.

20. The vehicle body according to claim 10, wherein:
the first side sill reinforcement is integrally connected to each side sill; and
the second side sill reinforcement is integrally connected to the floor assembly.

* * * * *